March 31, 1964     J. L. WIEGARDT, JR     3,126,865
OYSTER HARVESTING HARROW
Filed April 27, 1961     2 Sheets-Sheet 1
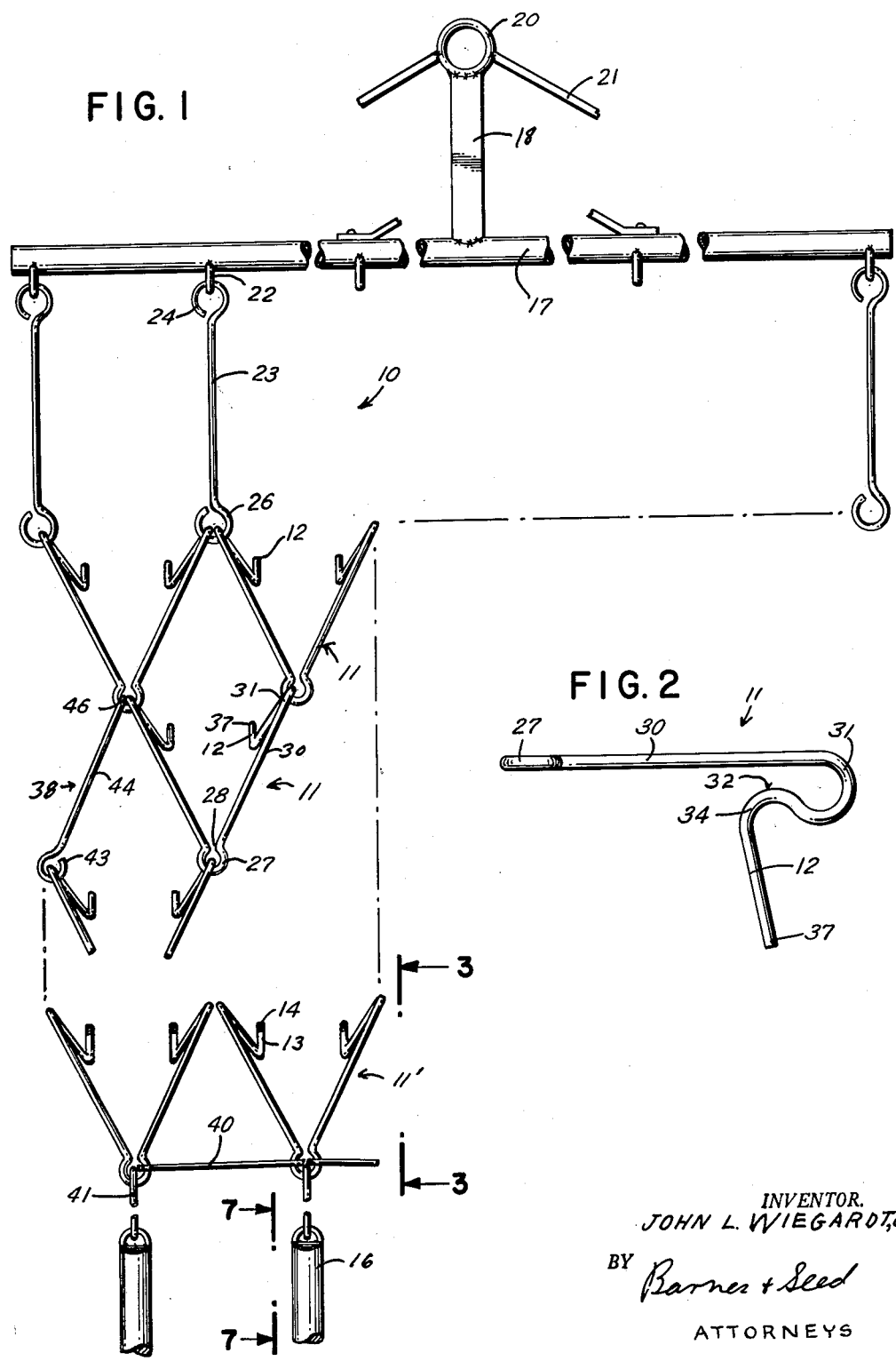
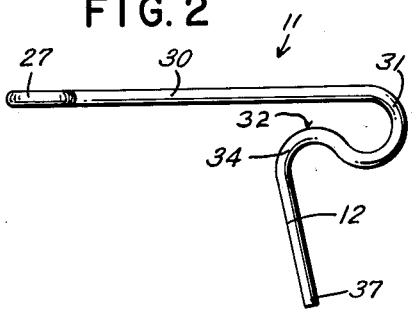
INVENTOR.
JOHN L. WIEGARDT, Jr.
BY Barnes + Seed
ATTORNEYS March 31, 1964     J. L. WIEGARDT, JR     3,126,865
OYSTER HARVESTING HARROW Filed April 27, 1961     2 Sheets-Sheet 2

INVENTOR.
JOHN L. WIEGARDT, Jr.
BY Barnes + Seed
ATTORNEYS

United States Patent Office 3,126,865
Patented Mar. 31, 1964

3,126,865
OYSTER HARVESTING HARROW
John L. Wiegardt, Jr., Box 236, Ocean Park, Wash.
Filed Apr. 27, 1961, Ser. No. 106,004
4 Claims. (Cl. 119—4)

This invention relates to the harvesting of oysters, and more particularly to a process for loosening and exposing the oysters so that they might be more easily gathered from their beds, and also to a harrow which accomplishes the same. The present application is an improvement of my pending application Ser. No. 27,862, filed May 9, 1960, now abandoned.

Oyster beds are located in shallow waters where the tides and the accompanying eddy currents cause gradual shifting of the silt and sand of which the beds are composed. Some of the oysters become buried in the sand and some will gather in large clumps with the shell of one oyster fastening itself to that of others. Harvesting the oysters is greatly facilitated when the oysters are loose and exposed on top of the bed, and when the oysters which have gathered in clumps are separated.

Therefore it is a general object of my invention to provide a harrow which will efficiently and expeditiously loosen and expose oysters in a bed so as to facilitate the gathering thereof.

Another general object is to provide a process for doing the same.

More specifically, this invention purports to provide a harrow which has a forward set of prongs to loosen the ground and break up the clumps and a following set of hooked prongs to lift the oysters thus exposing them for easy gathering.

A further particular object is to provide the harrow with a plurality of interlinking members which combine to form a flexible framework or network so that the prongs which depend therefrom will yield a moderate amount, thus facilitating a high percentage of recovery with a minimum of damage to the oyster shells.

Other still more particular objects and advantages of the invention will, with the foregoing, appear and be understood in the course of the following description and claims, the invention consisting in the novel construction and in the adaptation and combination of parts hereinafter described and claimed.

In the accompanying drawings:

FIGURE 1 is a fragmentary top plan view of an oyster harrow embodying preferred teachings of my invention.

FIG. 2 is a side elevational view of a V-link with depending prongs of a type which perform a loosening function.

Figure 3:
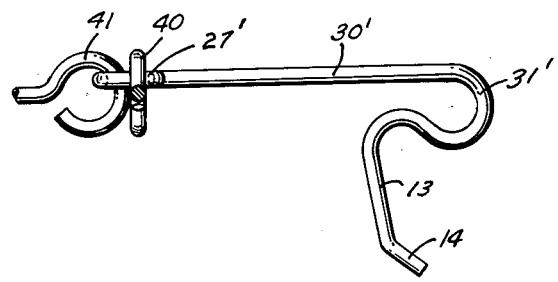
FIG. 3 is a fragmentary transverse vertical sectional view on line 3—3 of FIG. 1 and portraying in side elevation a V-link with depending prongs of a type which perform a lifting function.
Figure 4:
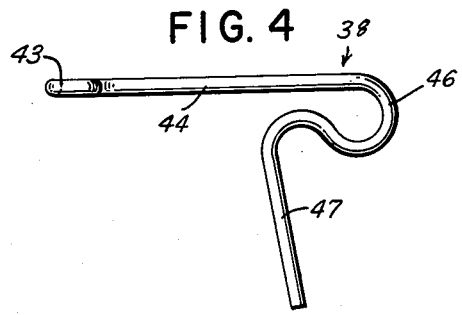
FIG. 4 is a side elevational view of an end link.
Figure 5:
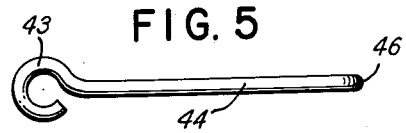
FIG. 5 is a top plan view of said end link.
Figure 6:
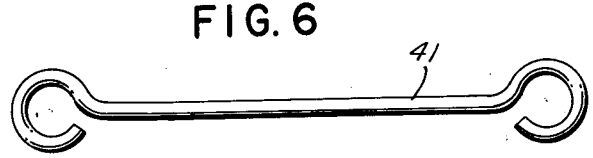
FIG. 6 is a side elevational view of a weight-connecting link.
Figure 7:
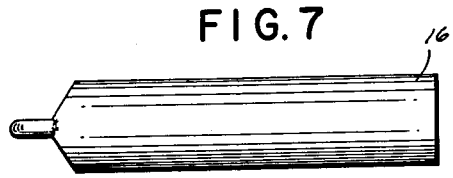
FIG. 7 is a side elevational view of a weight with the vantage point shown at 7—7 of FIG. 1.

It is believed that a more thorough understanding of the invention will be facilitated by first briefly depicting both the structure and operation of the harrow, and then describing the same in more detail.

The harrow 10 comprises a plurality of rigid V-shaped links 11, arranged in several rows and so interlinked one with another as to form one flexible network. The V-links at the forward portion of this network have substantially straight prongs 12 depending from said links with the free ends slanted forwardly in a very moderate degree from the vertical. The V-links at the rear of said network are designated by 11' and have depending prongs formed to an elbowed configuration as viewed from the side so as to provide two sections 13 and 14 lying angular to one another. The upper section 13 is slanted much the same as the prongs 12. The lower or tip sections 14 are bent forwardly therefrom to an angle of about thirty degrees from the horizontal. Weights 16 are provided at the rear of the network and a transverse draw-bar 17 is attached to the front.

In operation, this harrow is dragged by a boat or other suitable means over an oyster bed. As the front set of prongs dig into the bed, a general loosening of the soil and breaking up of the clumps of oysters takes place. The hooked prongs which follow immediately behind then lift the oysters to the surface of the bed. In this exposed position, the oysters are easily gathered in an appropriate manner, such as, for example, by passing a harvesting bag over the bed.

To describe the apparatus of the harrow 10 more particularly, the draw-bar 17 is a cylindrical pipe about ten feet in length. Projecting forward from the center of the draw bar is a tongue 18 which has a ring 20 welded to its front end to receive a hook carried upon the after end of a towing cable (not shown). Two diagonal bridle-forming struts 21 reach from opposite sides of the ring to the draw-bar. The towing cable angles downwardly from the tow boat and perforce applies a lift force to the front end of the harrow.

Spaced evenly along the length of the bar 17 are an even-numbered plurality of U-bolts 22 which are welded by their ends to the back side of the draw bar. Double-eyed connecting links 23, which are about a foot and a half in length, connect by their front eye 24 to a respective one of these U-bolts, extend rearwardly therefrom normal to the bar 17, and have their rear eye 26 attached to a front row of the V-links 11.

Each link 11 is formed from one continuous piece of heavy gauge wire rod stock. At its midlength the wire is doubled back on itself to form an apical loop 27, said loop being shaped as a U whose ends are brought moderately close to form a narrow throat 28. From this throat, the free ends of the wire form two diverging branches 30, which lie in a common horizontal plane with the apical loop. At each branch end, the wire is bent downwardly and doubled back to form a knee loop 31 which lies in, or approximately in, the same vertical plane. At the throat 32 of the knee loop, the wire describes a reverse curve 34 which lies in the same plane as that of the knee loop and the wire then extends downwardly and forwardly at an angle of about fifteen degrees from the vertical to form the aforementioned depending prong 12. It will be noted that the two tips 37 of the prongs 12 of a single V-link are thus spaced closer to each other than are the divergent ends of the branches, the spacing between the tips being about nine inches and the spacing between the extreme ends of the branches being about twelve inches. As can be clearly seen from an inspection of FIG. 1, the vertical planes occupied by the prongs parallel one another and are substantially normal to the travel path of the towed harrow. This is highly important, where prongs are slanted, as protection against damage to the delicate fringe portions of the oyster shells.

In passing on to the description of the lifting links 11', it is important to note that the distinguishing feature of the rows of V-links 11 at the front of the harrow, which perform the loosening function, with respect to the V-links 11' at the rear portion, which perform the lifting function, is in regard to the configuration of the tips. The apical loop 27, the diverging branches 30, and the knee loops 31 of the loosening links 11, find their counterpart in the elements 27', 30', and 31' of the lifting links 11'. The tips of the former, designated 37, are, however, merely axial prolongations of their prongs 12, while the tips 14 of the lifting prongs are bent forwardly about forty-five degrees from the axis of the root sections 13.

The V-links are interconnected in the following manner: The vertical knee loops 31 of the first row of V-links are connected one to the rear loop 26 of each of two adjacent connecting links 24. In like manner, a second row of V-links have their knee loops 31 connected to the apical loops 27 of the row immediately in front. The third row again has the same number of V-links as the first row, and the two outside knee loops 31 of the third row connect to the apical loop of the first row by means of an end link 38. The end link is similar in construction to one branch portion of a V-link, having a rear loop 43, a horizontal body portion 44, a vertical knee loop 46 at the forward end, and a prong 47 depending from the knee loop at the front of the link. The rear loop 43 connects to a knee loop 31 and the knee loop 46 connects to an apical loop 27.

The desired arrangement employs seven rows of V-links the first four of which carry loosening prongs 12, and the last three of which carry lifting prongs 13. Transverse rear links 40, similar in construction to the front connecting links 23, connect the apex loops 27 of the trailing row one to another. Longitudinally extending links 41, also similar in construction to the connecting links 23, are also attached to these aforementioned last row of apical loops, and connect by their rear ends with respective twenty pound weights 16.

When using a boat with a screw type propeller to tow the harrow, the bed is usually one which lies between 6½ feet to 14 feet below the water level. In shallower water, a boat powered by paddle wheels operates more effectively by holding the churning of the water to a practical minimum.

As the harrow passes over the bed, and being held down at the rear by the weights, the afore-mentioned lift of the cable raises the front prongs. The tips of the front row of prongs thus engage little more than the surface of the bed, and each succeeding row of prongs probes further into the bed. The forward prongs pull out a good portion of the weeds and eel grass which grow in the bed and desirably limit the circulation of water in the bed and also eliminate moss in the bed which, if not removed, eventually smothers the oysters. Such of the eradicated weeds and moss as do not cling to the forward prongs float to the surface of the water.

As each succeeding row of prongs digs deeper, the clumps of oysters are broken up and the buried oysters are lifted. The diamond shaped openings formed by the links of the network are made sufficiently large so that during this loosening and lifting many of the oysters will rise through these openings, and after the harrow passes will settle onto the surface of the bed. Thus the prongs of the harrow are not unnecessarily clogged during operation.

It is to be noted that besides cleaning the bed and exposing the oysters the harrow serves to level the bed by digging out the hills and filling the valleys.

During the growing season, it is desirable that the bed be cultivated several times. This keeps the oysters exposed where the natural flow of the sea water allows proper feeding. When the oysters are to be harvested, the harrow is or may be again passed over the bed to expose the oysters for gathering.

It is though that the invention will have been clearly understood from the foregoing detailed description of my now preferred illustrated embodiment. Changes in the details of construction may be resorted to without departing from the spirit of the invention and it is accordingly my intention that no limitations be implied and that the hereto annexed claims be given the broadest interpretation to which the employed language admits.

What I claim is:

1. An oyster bed harrow comprising a series of rows of connecting links each formed to a V-shape in plan configuration with the throat of the V facing forwardly and formed from rod stock with a respective probing prong depending from the outer end of each of the two forwardly diverging branches of each link to produce a harrowing tooth, a draw-bar arranged to be engaged by a tow-boat's tow-line and extending transversely of the harrow in front of the foremost row of links, connection between said draw-bar and the front row of links, and weights attached in trailing relation to the rearmost row of links.

2. The harrow of claim 1 in which all of the prongs point forwardly on an angle moderately inclined from the vertical and in which the prongs of the links in at least the rearmost row have their free ends more steeply inclined to present terminal hooks adapted to perform a lifting function upon ground-embedded oysters within an oyster bed through which the harrow is pulled.

3. The harrow of claim 1 in which all of the prongs occupy vertical planes which are substantially parallel to the longitudinal median line of the harrow, and thus are parallel to the course travelled by the harrow as the latter is pulled through the oyster bed.

4. The harrow of claim 1 in which the links are formed with return bends producing eye-forming loops at the point of juncture between the branches and the prongs, and are formed with a single eye-forming loop at the point of juncture of the two branches to receive the loops which said return bends produce.

References Cited in the file of this patent

UNITED STATES PATENTS

| | | |
|---|---|---|
| 250,242 | Haxton | Nov. 29, 1881 |
| 389,593 | Parmiter | Sept. 18, 1888 |
| 693,698 | Furrer | Feb. 18, 1902 |
| 1,542,670 | Cote | June 16, 1925 |
| 2,390,419 | Brown et al. | Dec. 4, 1945 |